US009860612B2

(12) United States Patent
Good et al.

(10) Patent No.: US 9,860,612 B2
(45) Date of Patent: Jan. 2, 2018

(54) MANIFEST GENERATION AND SEGMENT PACKETIZATION

(71) Applicant: Wowza Media Systems, LLC, Evergreen, CO (US)

(72) Inventors: Charles F. Good, Cincinnati, OH (US); Richard A. Collins, Highlands Ranch, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 14/250,010

(22) Filed: Apr. 10, 2014

(65) Prior Publication Data
US 2015/0296274 A1 Oct. 15, 2015

(51) Int. Cl.
*H04N 21/84* (2011.01)
*H04N 21/2343* (2011.01)
*H04N 21/235* (2011.01)
*H04N 21/858* (2011.01)

(52) U.S. Cl.
CPC ......... *H04N 21/84* (2013.01); *H04N 21/2343* (2013.01); *H04N 21/2353* (2013.01); *H04N 21/8586* (2013.01)

(58) Field of Classification Search
CPC ............... H04N 21/84; H04N 21/2343; H04N 21/2353; H04N 31/8586
USPC .......................................................... 725/93
See application file for complete search history.

(56) References Cited

U.S. PATENT DOCUMENTS

| 8,495,675 B1 * | 7/2013 | Philpott | H04H 20/103 725/105 |
| 9,479,807 B1 * | 10/2016 | Bugajski | H04N 21/2402 |
| 2008/0109557 A1 * | 5/2008 | Joshi | H04L 47/10 709/231 |

(Continued)

FOREIGN PATENT DOCUMENTS

| WO | WO 2012/030178 | * | 3/2012 | |
| WO | WO 2012/030178 A2 * | 3/2012 | ............. H04N 21/23 |

(Continued)

OTHER PUBLICATIONS

"First Live MPEG-DASH Large Scale Demonstration", Retrieved from <<http://dashpg.com/?page_id=194>, Retrieved on Jul. 31, 2013, Copyright 2012, MPEG DASH Industry Forum, 4 pages.

(Continued)

*Primary Examiner* — Nathan Flynn
*Assistant Examiner* — Tung T Trinh
(74) *Attorney, Agent, or Firm* — Toler Law Group, PC

(57) ABSTRACT

A method includes receiving, at a media server from a computing device, a first request for a manifest associated with media content. The method also includes generating, at the media server, the manifest based on a manifest type and a content segmentation type. The manifest identifies one or more segments of one or more adaptive streaming renditions. The method further includes sending the manifest from the media server to the computing device. The method includes receiving a second request from the computing device, where the second request identifies a requested segment of an adaptive streaming rendition identified by the manifest. The method also includes sending the requested segment from the media server to the computing device in response to the second request.

20 Claims, 4 Drawing Sheets

(56) References Cited

U.S. PATENT DOCUMENTS

| | | | |
|---|---|---|---|
| 2011/0099594 A1* | 4/2011 | Chen | H04N 21/23439 725/105 |
| 2011/0119394 A1* | 5/2011 | Wang | H04N 21/23439 709/231 |
| 2011/0239078 A1* | 9/2011 | Luby | H04N 21/23106 714/752 |
| 2012/0259946 A1* | 10/2012 | Stockhammer | H04L 65/105 709/217 |
| 2013/0086631 A1* | 4/2013 | Archer | H04L 65/605 726/1 |
| 2013/0159546 A1* | 6/2013 | Thang | H04L 65/4084 709/231 |
| 2013/0191511 A1* | 7/2013 | Liu | H04L 67/2847 709/219 |
| 2013/0246643 A1* | 9/2013 | Luby | H04N 21/23439 709/231 |
| 2013/0346472 A1* | 12/2013 | Wheeldon | H04L 67/2814 709/203 |
| 2014/0006564 A1* | 1/2014 | Thang | H04L 65/601 709/219 |
| 2014/0108591 A1* | 4/2014 | Daviduk | H04N 21/23103 709/217 |
| 2014/0281002 A1* | 9/2014 | Sun | H04L 29/06455 709/231 |
| 2014/0304373 A1* | 10/2014 | Tarbox | H04L 65/60 709/219 |
| 2015/0237103 A1* | 8/2015 | Lotfallah | H04L 65/607 709/219 |

FOREIGN PATENT DOCUMENTS

| | | | | |
|---|---|---|---|---|
| WO | WO 2012/125006 A2 * | 9/2012 | | H04N 7/24 |
| WO | WO 2014/063730 * | 5/2014 | | H04W 4/06 |

OTHER PUBLICATIONS

"Overview of MPEG-DASH Standard", Retrieved from http://dashif.org/mpeg-dash/>>, Retrieved on Mar. 17, 2014, Copyright 2013, MPEG DASH Industry Forum, 3 pages.

Sodagar, I., "MPEG-DASH: The Standard for Multimedia Streaming Over Internet", IEEE Multimedia, vol. 18, Issue 4, Apr. 2011, Updated Apr. 2013, IEEE Computer Society, Piscataway, NJ, p. 62-67.

Towes, K., "Adobe Announces Support for MPEG-DASH Streaming Standard", Retrieved from <<http://blogs.adobe.com/ktowes/2012/02/adobe-announces-support-for-mpeg-dash-streaming-standard.html, Retrieved on Jul. 31, 2013, Created on Feb. 27, 2012, Adobe Systems Incorporated, 2 pages.

* cited by examiner

MANIFEST GENERATION AND SEGMENT PACKETIZATION

BACKGROUND

The popularity of the Internet, coupled with the increasing capabilities of personal/mobile electronic devices, has provided consumers with the ability to enjoy multimedia content almost anytime and anywhere. For example, live content (e.g., sports events) and video on demand (VOD) content (e.g., television shows and movies) can be streamed via the Internet to personal electronic devices (e.g., computers, mobile phones, Internet-enabled televisions, etc.). Various types of personal electronic devices are available to consumers. Different devices may have different screen sizes and may be compatible with different audio formats, video formats, streaming protocols, wireless connection speeds, etc. In addition, different consumer devices may exhibit different performance characteristics or have different abilities to consume high bitrate streams or decode complex streams. For example, some mobile devices may only be able to consume "baseline" profile encoded video streams, whereas other mobile devices may have the ability to consume "high" profile encoded streams, which may include more complex (e.g., more highly compressed) streams at a higher bitrate. Thus, content producers may face difficulty in providing content to consumers due to format/protocol incompatibilities with certain consumer devices and due to changes in network connection speed.

SUMMARY

When streaming media content (e.g., audio and/or video content) from a server, a computing device may experience fluctuations in network bandwidth. One way of dynamically adjusting an ongoing stream in the presence of such network bandwidth fluctuations is adaptive bitrate (ABR) streaming. In ABR streaming, the computing device requests a "manifest" from the server. The manifest can include information about different "renditions" of a stream that are available for adaptive bitrate streaming. Each rendition may have different audio and/or video properties, and therefore certain renditions may be more preferable than others for streaming in certain network bandwidth conditions. The computing device may select a particular rendition of the stream and can then request "chunks" (alternately referred to as "segments") of the selected rendition from the server. When network bandwidth changes, the computing device may switch to a different rendition.

Various ABR streaming protocols have been established (or are under discussion by industry standardization bodies). For example, ABR streaming protocols may include, but are not limited to, hypertext transfer protocol (HTTP) live streaming (HLS), HTTP dynamic streaming (HDS), smooth streaming, and MPEG dynamic adaptive streaming over HTTP (MPEG-DASH). MPEG-DASH is also known as international organization for standardization (ISO)/international electrotechnical commission (IEC) 23009-1. Some streaming protocols leave a considerable amount of discretion to an implementer. For example, MPEG-DASH supports multiple manifest types and segment formats. Thus, two "MPEG-DASH compliant" end-user devices (e.g., media players) may expect different manifest types and segment formats. This may complicate the server's ability to serve streams to MPEG-DASH compliant devices.

In accordance with the described techniques, a media server is configured to dynamically generate manifests and segments based on requests from a media player. For example, a media player may initially request a manifest of a particular stream from the media server. The stream can be a live stream or a VOD stream that is transcoded by a transcoder at the media server into multiple ABR renditions. The initial request may optionally specify a manifest type and/or a content segmentation type. The media server dynamically generates the manifest for the computing device based on the manifest type and a content segmentation type. If the manifest type or content segmentation type is not specified, the media server may generate the manifest in accordance with a default manifest type or a default content segmentation type. Depending on the initial request (or the defaults), the media server may include a segment uniform resource locator (URL) template in the manifest or a list of segment URLs in the template. The segment URL template can be number-based (which enables the computing device to request segments by segment number) or the segment URL template can be time-based (which enables the computing device to request segments by segment start time). The computing device can use the manifest to request specific segment(s) of specific rendition(s) from the media server.

DETAILED DESCRIPTION

Figure 1:
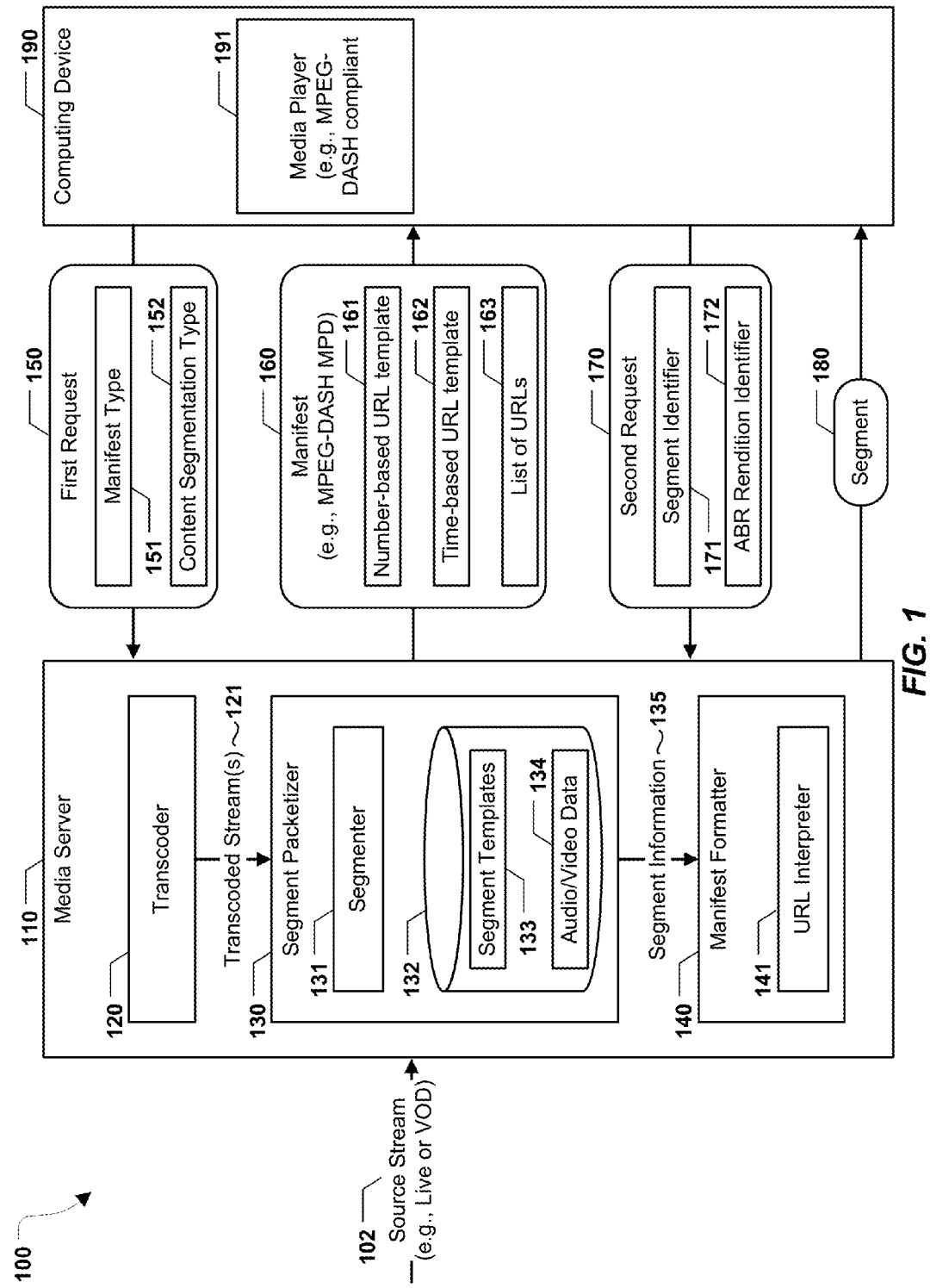
FIG. 1 is a diagram of a particular embodiment of a system that is operable to perform dynamic manifest generation and segment packetization.

FIG. 1 illustrates a particular embodiment of a system 100 that is operable to perform dynamic manifest generation and segment packetization. The system includes a media server 110 that is communicably coupled to a computing device 190. For example, the media server 110 and the computing device 190 may communicate via a network, such as a local area network (LAN), a wide area network (WAN), and/or the Internet.

The media server 110 may include a transcoder 120, a segment packetizer 130, and a manifest formatter 140, each of which may correspond to hardware, software (e.g., instructions executable by one or more processors of the media server 110), or a combination thereof. Although FIG. 1 illustrates the media server 110 including the transcoder 120, in an alternate embodiment the media server 110 does not include the transcoder 120. When included, the transcoder 120 may be configured to perform bitrate conversion, coder/decoder (CODEC) conversion, frame size conversion, etc. For example, the media server 110 may receive a source stream 102 and the transcoder 120 may transcode the source stream 102 to generate one or more transcoded streams 121. The source stream 102 may be a live stream or a video on demand (VOD) stream. In a particular embodiment, the media server 110 receives the source stream 102 from an external source (e.g., a stream capture source, a data storage device, another media server, etc.). To illustrate, the media server 110 may receive the source stream 102 via a wired or wireless network connection. In an alternate embodiment, the source stream 102 may be generated by the media server 110. For example, the source stream 102 may correspond to a VOD content item that is stored at the media server 110 (e.g., a television show, a movie, a digital video recorder (DVR) recording of a previously received live stream, etc.).

In a particular embodiment, each of the transcoded streams 121 corresponds to a different adaptive bitrate (ABR) rendition of the source stream 102. For example, the transcoded streams 121 may differ from each other with respect to one or more of audio bitrate, number of audio channels, audio CODEC, video bitrate, video frame size, video CODEC, etc. The transcoded streams 121 may be made available to computing devices (e.g., the computing device 190) for adaptive streaming, as further described herein.

Thus, in some examples, a single high bitrate source video/audio stream 102 may be used to generate one or more renditions that have lower bitrates and/or alternative CODECs on-the-fly. As an illustrative, non-limiting example, a CODEC switch from an H.264/advanced audio coding (AAC) input stream to a VP8 rendition and a Vorbis rendition may be performed. As another example, audio formats may be switched from a surround sound format to a stereo format. In a particular embodiment, the transcoder 120 transcodes the incoming source stream 102 such that key frames (e.g., intra-coded frames (I-frames)) in each of the transcoded streams 121 occur at the same time as in the source stream 102. That is, each of the transcoded streams 121 may be "key frame aligned" to enable seamless switching between different ABR renditions by a destination device (e.g., the computing device 190), as further described herein.

The segment packetizer 130 may include a segmenter 131. The segment packetizer 130 may also include (or have access to) a data storage device 132, as shown. The segmenter 131 may divide a set of ABR renditions (e.g., the transcoded streams 121) into media segments. For example, the segmenter 131 may receive a target segment duration. As an illustrative, non-limiting example, the target duration may be approximately ten thousand milliseconds. The target segment duration may be received via user input or via a configuration file at the media server 110. Alternately, the target segment duration may be dynamically determined based on properties of the source stream 102, the media server 110, etc. As an illustrative, non-limiting example, when the target segment duration is ten seconds, the segmenter 131 may process the incoming transcoded streams 121 and break the transcoded streams 121 into segments at key frame boundaries approximately ten seconds apart. Further, if the transcoded streams 121 include separate video and audio streams, the segmenter 131 may generate the segments such that the video and audio streams are timecode aligned.

In a particular embodiment, the media server 110 supports multiple content segmentation types. The segmenter 131 may generate segments for each of the content segmentation types supported by the media server 110. Segments may alternately be referred to as "chunks." As an illustrative, non-limiting example, the media server 110 may support both multiplexed segments (video and audio data included in a single multiplexed stream) and non-multiplexed segments (video and audio data included in separate non-multiplexed streams). Further, in the case of MPEG-DASH, the media server 110 may support container formats in compliance with international standards organization base media file format (ISOBMFF, associated with a file extension ".m4s"), motion picture experts group 2 transport stream (MPEG-TS), extensible binary markup language (EBML), WebM, Matroska, or any combination thereof.

In a particular embodiment, the segmenter 131 employs a "smart" storage system to avoid replicating audio/video data when generating segments for each content segmentation type. In one example, if the media server 110 supports N content segmentation types (where N is an integer greater than zero), the segmenter 131 generates N segment templates 133 for each segment (e.g., ten second portion) of each of the transcoded streams 121. Each segment template 133 may include header information associated with a content segmentation type, data indicating a start position or start time of the segment in the source stream 102, and data indicating an end position or end time of the segment in the source stream 102. Thus, in the case of MPEG-DASH, different segment templates may be generated for ISOBMFF multiplexed ("muxed"), ISOBMFF non-multiplexed ("demuxed"), MPEG-TS muxed, MPEG-TS demuxed, EBML muxed, EBML demuxed, etc. Advantageously, each of the segment templates 133 may not include the underlying audio/video data 134 of the corresponding segment. Thus, even though multiple segment templates 133 may be generated for each segment of the source stream 102, the underlying segment audio/video data 134 may be stored once. The start and end position data in the segment templates 133 may be used to dynamically generate and deliver segment packets to destination devices in a just-in-time fashion, as further described herein. As the segment templates 133 are generated, the segmenter 131 may generate and provide segment information 135 regarding the segment templates 133 to the manifest formatter 140, as shown.

During operation, the manifest formatter 140 may dynamically generate manifests based on the segment information 135 received from the segment packetizer 130. For example, the media server 110 may receive a first request 150 from the computing device 190. To illustrate, a media player 191, such as an MPEG-DASH compliant media player, may issue the first request 150 for a manifest associated with the source stream 102. The first request 150 may optionally indicate a manifest type 151 and a content segmentation type 152. If the first request 150 does not indicate the manifest type 151, the media server 110 may resort to a default manifest type. Similarly, if the first request 150 does not indicate the content segmentation type 152, the media server 110 may resort to a default content segmentation type. The default manifest type and the default content segmentation type may be user-defined, may be defined in accordance with an industry standard (e.g., MPEG-DASH), may be specified as part of configuration settings of the media server 110, etc.

In an illustrative example, the first request 150 is issued in response to a user of the computing device 190 selecting a URL that includes the manifest type 151 and the content segmentation type 152. In the case of MPEG-DASH, the manifest may be a MPEG-DASH media presentation description (MPD) file. In a particular embodiment, the MPEG-DASH MPD may be requested via a URL that is formatted as follows:

http://[media server ip address]:[port number]/ . . . /[stream name]/manifest_mp[content segmentation type]_mv [manifest type].mpd In the various examples of URLs and URL templates herein, square brackets ('[' and ']') are used to denote variables. For example, possible values for [content segmentation type] may include, but are not limited to: "m4sav" (ISOBMFF container, demuxed audio/video (A/V), "m4smuxed" (ISOBMFF container, muxed A/V), "mp2t" (MPEG-TS container, muxed A/V by default), "webmav" (WebM container, demuxed A/V), and "webmmuxed" (WebM container, muxed A/V). Possible values for [manifest type] may include, but are not limited to: "list" (list of segment URLs), "time" (time-based segment URL template), and "number" (segment number-based URL template). Thus, the following URL may be used to retrieve an MPEG-DASH MPD for a stream that provides demuxed segments in ISOBMFF containers, where the MPD includes a list of segment URLs:

http://localhost:1935/ . . . /myStream/manifest_mpm4sav_mvlist.mpd

The manifest formatter 140 may include a URL interpreter 141 that determines the manifest type 151 and the content segmentation type 152 in the first request 150. When the manifest type 151 is list-based, the manifest formatter 140 generates, based on the segment information 135, a manifest 160 that includes a list of URLs 163. The list of URLs may include URLs specific to one or more segments of one or more ABR renditions.

When the manifest type 151 is number-based, the manifest 160 includes a number-based URL template 161 that can be used by the computing device 190 to construct URLs to request individual segments by segment number. For example, the number-based URL template 161 may be:

http://[media server ip address]:[port number]/ . . . /[stream name]/chunk_ct[chunk content of "video," "audio," or "media"]_cf[chunk format of "m4s," "webm," or "ts"]_rid[ABR_rendition_identifier]_cn[segment_number]_mpd.m4s Thus, to request the $6^{th}$ video chunk (i.e., video segment) of the $0^{th}$ ABR rendition in the ISOBMFF container format, the computing device 190 may generate a second request 170 including a segment identifier 171 of "6" and an ABR rendition identifier 172 of "0":

http://localhost:1935/ . . . /myStream/chunk_ctvideo_cfm4s_rid0_cn6_mpd.m4s

When the manifest type 151 is time-based, the manifest 160 includes a time-based URL template 162 that can be used by the computing device 190 to construct URLs to request individual segments by segment start time. For example, the time-based URL template 162 may be:

http://[media server ip address]:[port number]/ . . . /[stream name]/chunk_ct["video," "audio," or "media"]_cf["m4s," "webm," or "ts"]_rid[ABR_rendition_identifier]_cs[segment_start time]_mpd.m4s The manifest 160 may identify one or more segments of one or more adaptive streaming renditions of the source stream 102. As an illustrative non-limiting example, the transcoded streams 121 generated by the transcoder 120 may include three ABR renditions of the source stream 102: a first rendition with a bitrate of 2 megabits per second (Mbps) and a frame size of 720p, a second rendition with a bitrate of 750 kilobits per second (Kbps) and a frame size of 360p, and a third rendition with a bitrate of 250 kbps and a frame size of 120p. In an alternate embodiment, more, fewer, and/or different adaptive streaming renditions may be generated by the transcoder 120, where each generated adaptive streaming rendition(s) has a plurality of key frame aligned segments. Thus, the manifest formatter 140 may generate manifests based on the segment information 135 from the segment packetizer 130, including information regarding the segment(s) of the adaptive streaming rendition(s) generated by the transcoder 120.

In a particular embodiment, a different manifest may be generated for each client (e.g., media player or device) that requests a manifest, even if two clients specify the same manifest type and content segmentation type. Thus, the manifest 160 may be specific to the media player 191 and/or the computing device 190. Each URL or URL template in the manifest 160 may include embedded session information that identifies the media player 191 and/or the computing device 190. The session information may be used to uniquely identify the requester of a segment. Thus, by generating a different manifest for each client, the media server 110 may track various items (e.g., number of segments, number of ABR rendition switches, etc.) on a per-client basis.

In response to the second request 170, the media server 110 may generate a corresponding segment 180 and send the segment 180 to the computing device 190. For example, the segment 180 may be generated based on one of the segment templates 133 and may include selected data from the audio/video data 134. In a particular embodiment, the segment 180 may also be stored in a cache at the media server 110 for subsequent retrieval (e.g., in response to a request for the segment 180 from another computing device). As additional computing devices (not shown) connect to the media server 110 to access the source stream 102, the media server 110 may provide manifests and requested segments to the additional computing devices.

In a particular embodiment, when the media server 110 and the computing device 190 communicate via an MPEG-DASH protocol, the media server 110 may provide three kinds of files to the computing device 190. The first type of file is an MPEG-DASH MPD file, such as the manifest 160. As explained above, an MPEG-DASH MPD file can correspond to various manifest types (alternately referred to as "variations") and content segmentation types (alternately referred to as "profiles"). The second type of file is an MPEG-DASH media segment, such as the segment 180. An MPEG-DASH media segment includes audio and/or video data for a stream. MPEG-DASH media segments can be in different formats, including but not limited to ISOBMFF, MPEG-TS, and WebM. Further, a MPEG-DASH media segment can contain muxed A/V data, only audio data, or only video data. The data may be encoded using a CODEC supported by MPEG-DASH, including but not limited to H.264, AAC, VP8, and Vorbis. The third type of file is an MPEG-DASH initialization segment. MPEG-DASH initialization segments may include data to initialize a media player (e.g., the media player 191) and/or to determine whether the media player is capable of decoding a stream. In a particular embodiment, after receiving the manifest 160, the computing device 190 requests at least one MPEG-DASH initialization segment before requesting any MPEG-DASH media segments. For example, an MPEG-DASH initialization segment may be received once per ABR rendition. Thus, if the computing device 190 switches to a new ABR rendition in response to a change in network conditions, a new MPEG-DASH initialization segment may be requested prior to requesting any MPEG-DASH media segments of the new ABR rendition.

In a particular embodiment, when the source stream 102 is a live stream, the media server 110 generates segments (e.g., the segment templates 133 and the audio/video data 134) in real-time or near real-time, as the source stream 102 is received. When a media player (e.g., the media player 191) requests a particular segment in a particular format, the media server 110 builds the requested segment on-the-fly using the segment templates 133. When the source stream 102 is a VOD stream, the source stream 102 may be received, partially or entirely, prior to any requests from media players. In this case, when the media server 110 receives the source stream 102, the media server 110 may index the source stream 102 to determine segment start/end boundaries and may store the index information in a file. However, the media server 110 may not create any actual segment templates 133 or break out segment audio/video data 134 when the VOD content is received. When a manifest is requested, the index information may be used by the manifest formatter 140 to build a manifest. A segment template 133 and segment audio/video data 134 may not be generated until the first time a segment is requested by a media player.

It should be noted that although a single source stream 102 and a single computing device 190 are illustrated in FIG. 1, this is not to be considered limiting. In accordance with the described techniques, the media server 110 may receive any number of source streams 102 and may provide dynamically generated manifests and segments/packets to any number of computing devices 190.

The system 100 of FIG. 1 may thus provide dynamic manifest and segment generation that is compatible with implementation-agnostic ABR protocols, such as MPEG-DASH. The system 100 may provide a flexible mechanism to provide a stream (e.g., the source stream 102) in accordance with multiple MPEG-DASH supported manifest types, in accordance with multiple MPEG-DASH supported segment formats, and at multiple bitrates. Thus, the system 100 of FIG. 1 may support various types of media players, including media players that only support a subset of the technologies defined in an MPEG-DASH industry standard. For example, a first media player may only support segment number-based retrieval muxed MPEG-TS segments and a second media player may only support WebM segments. In contrast to less flexible systems, the system 100 of FIG. 1 may dynamically generate an appropriate manifest for each of the computing devices and may provide segments to each of the computing devices.

Figure 2:
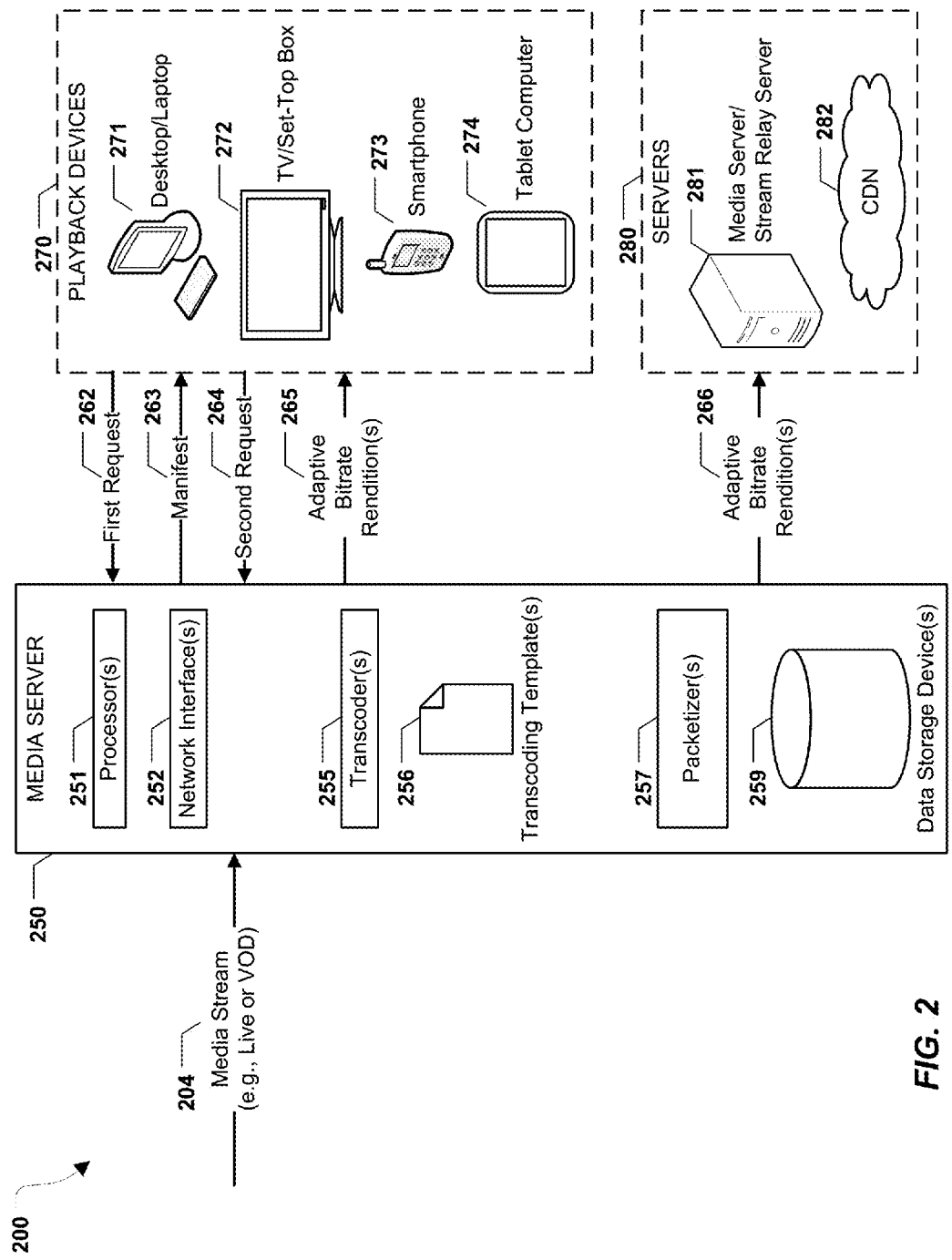
FIG. 2 is a diagram of another particular embodiment of a system that is operable to perform dynamic manifest generation and segment packetization.

FIG. 2 illustrates another embodiment of a system 200 that is operable to perform dynamic manifest generation and segment packetization. The system includes a media server 250. In an illustrative embodiment, the media server 250 corresponds to the media server 110 of FIG. 1.

The media server 250 may include one or more processors 251 and various components that are executable by the processor(s) 251. The media server 250 may correspond to or include software application(s) that perform media serving or processing, hardware systems (e.g., servers) that support or perform media serving or processing, or any combination thereof. Thus, various operations described with reference to the media server 250, or components thereof, may be implemented using hardware, software (e.g., instructions executable by the processor(s) 251), or any combination thereof.

The media server 250 may include one or more network interfaces 252. For example, the network interface(s) 252 may include input interface(s) and output interface(s) that are configured to receive data and to send data, respectively. In a particular embodiment, the network interface(s) 252 may be wired and/or wireless interfaces that enable the media server 250 to communicate data via a network, such as the Internet. For example, the network interface(s) 252 may include an Ethernet interface, a wireless interface compatible with an IEEE 802.11 protocol, or other wired or wireless interfaces.

The media server 250 may include various components configured to perform stream processing functions. For example, the media server 250 may include one or more video processing components, such as transcoders 255, which may be implemented using hardware, software (e.g., instructions executable by the processor(s) 251), or both. The transcoder(s) 255 may decode data received by the media server 250. For example, the transcoder(s) 255 may decode a received media stream 204. In an illustrative embodiment, the media stream 204 is the source stream 102 of FIG. 1. The media stream 204 may be a live or VOD audio-only, video-only, or A/V stream. The transcoder(s) 255 may also encode data that is to be transmitted by the media server 250. The transcoder(s) 255 may further be configured to perform bitrate conversion, CODEC conversion, frame size conversion, etc. In a particular embodiment, parameters used by the transcoder(s) 255 are stored in one or more transcoding templates 256 at the media server 250 and/or received via user input at a configuration graphical user interface (GUI) of the media server 250.

The transcoder(s) 255 may thus enable the media server 250 to process data in accordance with multiple coding technologies and protocols. To illustrate, the media server 250 may convert a media stream (e.g., audio and/or video data) from one format or transmission protocol to multiple other formats or transmission protocols. For example, video streams received and transmitted by the media server 250 may be associated with the same encoding format and transmission protocol or may be associated with different encoding formats and transmission protocols. In a particular embodiment, the media server 250 may generate video streams by performing video transcoding and/or transmuxing operations (e.g., to modify a video encoding format, an audio encoding format, a bitrate, an aspect ratio, packaging, etc.). In a transmuxing operation, encoded audio and video may be repackaged without modifying the encoded audio and video.

For example, the media server 250 may support video encoding types including, but not limited to, H.264, On2 VP6, Sorenson Spark, Screen video, Screen video 2, motion picture experts group (MPEG) 2 (MPEG-2), and MPEG-4 Part 2. The media server 250 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

Further, the media server 250 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG-DASH. The media server 250 may also support real time messaging protocol (RTMP) (and variants thereof), real-time streaming protocol (RTSP), real-time transport protocol (RTP), and MPEG-TS. Additional audio formats, video formats, coder/decoders (CODECs), and/or protocols may also be supported. Different transcoder operations may occur at the media server 250 at different times, depending on the types of input streams being received by the media server 250 and output streams being sent by the media server 250.

In a particular embodiment, the media server 250 includes one or more data storage devices 259 (e.g., random access memory (RAM), disk-based storage, solid-state non-volatile memory, etc.). The data storage device(s) 259 may store stream data (e.g., frames of a live or VOD stream), files, closed caption data, images (e.g., to be overlaid on top of a video stream), etc. The data storage device(s) 259 may also store segment templates and segment A/V data, as described with reference to the data storage device 132 of FIG. 1.

The media server 250 may be configured to send and receive data from various other devices. For example, the media server 250 may communicate with one or more playback devices 270 (e.g., devices that are configured to stream video content) and one or more other servers 280. In an illustrative embodiment, the computing device 190 of FIG. 1 is one of the playback devices 270. Examples of playback devices include a smartphone, a tablet computer, a laptop computer, a desktop computer, a set-top box, a television, a portable media player, a game console, etc. In the embodiment of FIG. 2, the playback devices 270 include a desktop/laptop computing device 271, a television (TV)/set-top box 272, a smartphone 273, and a tablet computer 274. Examples of servers include a media server, a stream relay server, a server of a content distribution network (CDN), such as an edge server, etc. In the embodiment of FIG. 2, the other servers 280 include a media server/stream relay server 281 and a server of a CDN 282.

In a particular embodiment, the media server 250 supports adaptive bitrate (ABR) streaming. For example, the media server 250 may perform one or more stream processing operations on the media stream 204 to generate a plurality of ABR renditions 265, 266. To illustrate, such operations may be performed by the transcoder(s) 255 (e.g., including the transcoder 120 of FIG. 1) and packetizer(s) 257 (e.g., collectively corresponding to the segment packetizer 130 of FIG. 1 and the manifest formatter 140 of FIG. 1).

In a particular embodiment, the media server 250 generates an adaptive streaming manifest 263 (e.g., the manifest 160 of FIG. 1) that includes information describing each of the ABR renditions 265, 266 that are available for adaptive streaming. To initiate an adaptive streaming session, a destination device, e.g., the computing device 271, may request the manifest 263 by sending a first request 262 (e.g., the first request 150 of FIG. 1). The first request 262 may indicate a manifest type and a content segmentation type. In response to the first request 262, the media server 250 may dynamically generate and send the manifest 263 to the computing device 271. Upon receiving the manifest 263, the computing device 271 may determine which of the available renditions should be requested from the media server 250. For example, the computing device 271 may make such a determination based on a buffering/processing capability at the computing device 271 and/or network conditions (e.g., bandwidth) being experienced by the computing device 271.

Upon determining which rendition should be requested, the computing device 271 may transmit a second request 264 to the media server 250. The second request 264 may specify a particular segment (e.g., segment "X") of the requested rendition. Depending on whether the manifest 263 is a number-based manifest, a time-based manifest, or a list-based manifest, the particular segment may be specified using a segment number/identifier, a segment start time (e.g., a start frame number, a start timecode, etc.), etc. In the case of MPEG-DASH, the manifest 263 may be an MPEG-DASH MPD file and the computing device 271 may request one or more MPEG-DASH initialization segments prior to requesting any MPEG-DASH media segments.

Depending on the adaptive streaming protocol in use, the requested segment may correspond to a "chunk" of a rendition and/or a group of pictures (GOP). For example, the "chunk" may be a fixed length duration (e.g., approximately ten seconds) or a variable length duration of an ABR rendition. A group of pictures may refer to a collection of video frames that includes one or more intra-coded frames (I-frames) and one or more additional frames that include difference information relative to the one or more I-frames (e.g., P-frame and/or B-frames). If there are no problems with receipt and playback of the requested portion, the computing device 271 may request a subsequent segment (e.g., segment "X+1") of the same rendition. However, if playback and/or network conditions become worse, the computing device 271 may switch to a lower bitrate rendition by requesting subsequent segments of the lower bitrate rendition. Conversely, if playback and/or network conditions improve, the computing device 271 may switch to a higher bitrate rendition. The media server 250 may generate key frame aligned portions for the adaptive streaming renditions, so that switching to a lower bitrate or higher bitrate rendition appears "seamless" (e.g., does not result in noticeable visual glitches or dropped frames), as described with reference to FIG. 1.

The system 200 of FIG. 2 may thus simplify the complexity of ABR streaming delivery, including MPEG-DASH delivery. For example, the media server 250 may present a single live or VOD stream to many different MPEG-DASH compliant players, even in situations where the MPEG-DASH compliant players support different subsets of the MPEG-DASH standard (e.g., different manifest types, content segmentation types, etc.).

Figure 3:
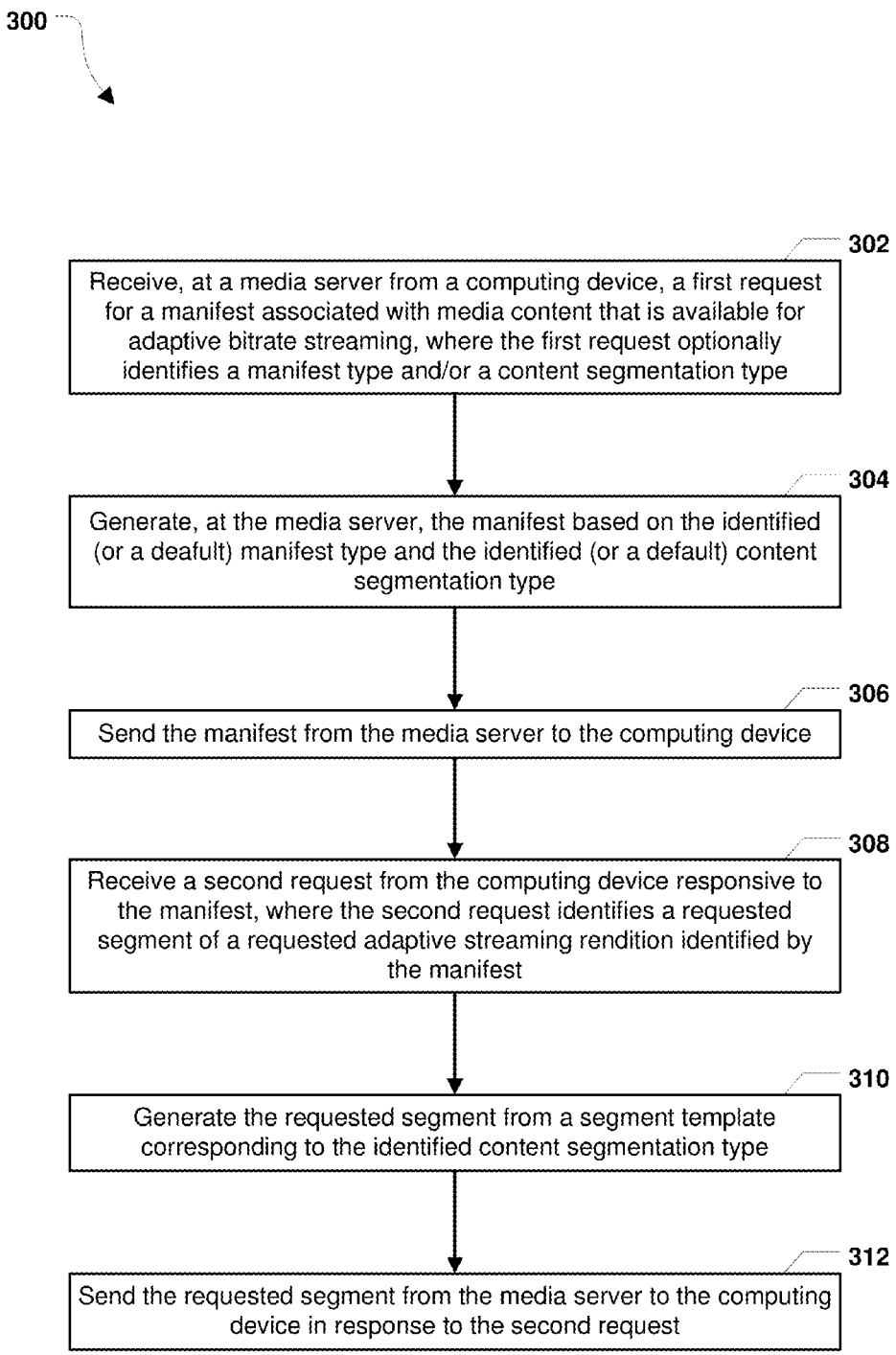
FIG. 3 is a flowchart of a particular embodiment of a method of operation at the system of FIG. 1 or the system of FIG. 2.

FIG. 3 illustrates a particular embodiment of a method 300 of operation at the system 100 of FIG. 1 or the system 200 of FIG. 2. The method 300 includes receiving, at a media server from a computing device, a first request for a manifest associated with media content that is available for adaptive bitrate streaming, at 302. The first request may optionally identify a manifest type and/or a content segmentation type. For example, in FIG. 1, the media server 110 may receive the first request 150, which may optionally identify the manifest type 151 and/or the content segmentation type 152. As another example, in FIG. 2, the media server 250 may receive the first request 262.

The method 300 also includes generating, at the media server, the manifest based on the identified manifest type and content segmentation type, at 304. Alternatively, if the first request does not identify a manifest type or a content segmentation type, the media server may generate the manifest based on a default manifest type or a default content segmentation type. The manifest may identify one or more segments of one or more adaptive streaming renditions. For example, in FIG. 1, the manifest formatter 140 may generate the manifest 160. As another example, in FIG. 2, the media server 250 may generate the manifest 263. In an illustrative embodiment, the generated manifest is an MPEG-DASH MPD that includes a list of segment URLs, a number-based segment URL template, and/or a time-based segment URL template.

The method 300 further includes sending the manifest from the media server to the computing device, at 306. For example, in FIG. 1, the media server 110 may send the manifest 160 to the computing device 190. As another example, in FIG. 2, the media server 250 may send the manifest 263 to the computing device 271.

The method 300 includes receiving a second request from the computing device responsive to the manifest, at 308. The second request identifies a requested segment of an adaptive streaming rendition identified by the manifest. For example, in FIG. 1, the media server 110 may receive the second request 170, including the segment identifier 171 and the ABR rendition identifier 172. As another example, in FIG. 2, the media server 250 may receive the second request 264.

The method 300 includes generating the requested segment from a segment template corresponding to the identified content segmentation type, at 310, and sending the requested segment from the media server to the computing device in response to the second request, at 312. For example, in FIG. 1, the media server 110 may generate the segment 180 based on one of the segment templates 133 and may send the segment 180 to the computing device 190. As another example, in FIG. 2, the media server 250 may generate and send a segment to the computing device 271 as part of one of the ABR rendition(s) 265. The method 300 of FIG. 3 may thus enable a media server to dynamically generate manifests (e.g., MPEG-DASH MPD files) and stream segments (e.g., MPEG-DASH initialization segments and MPEG-DASH media segments) in response to requests from computing devices.

Figure 4:
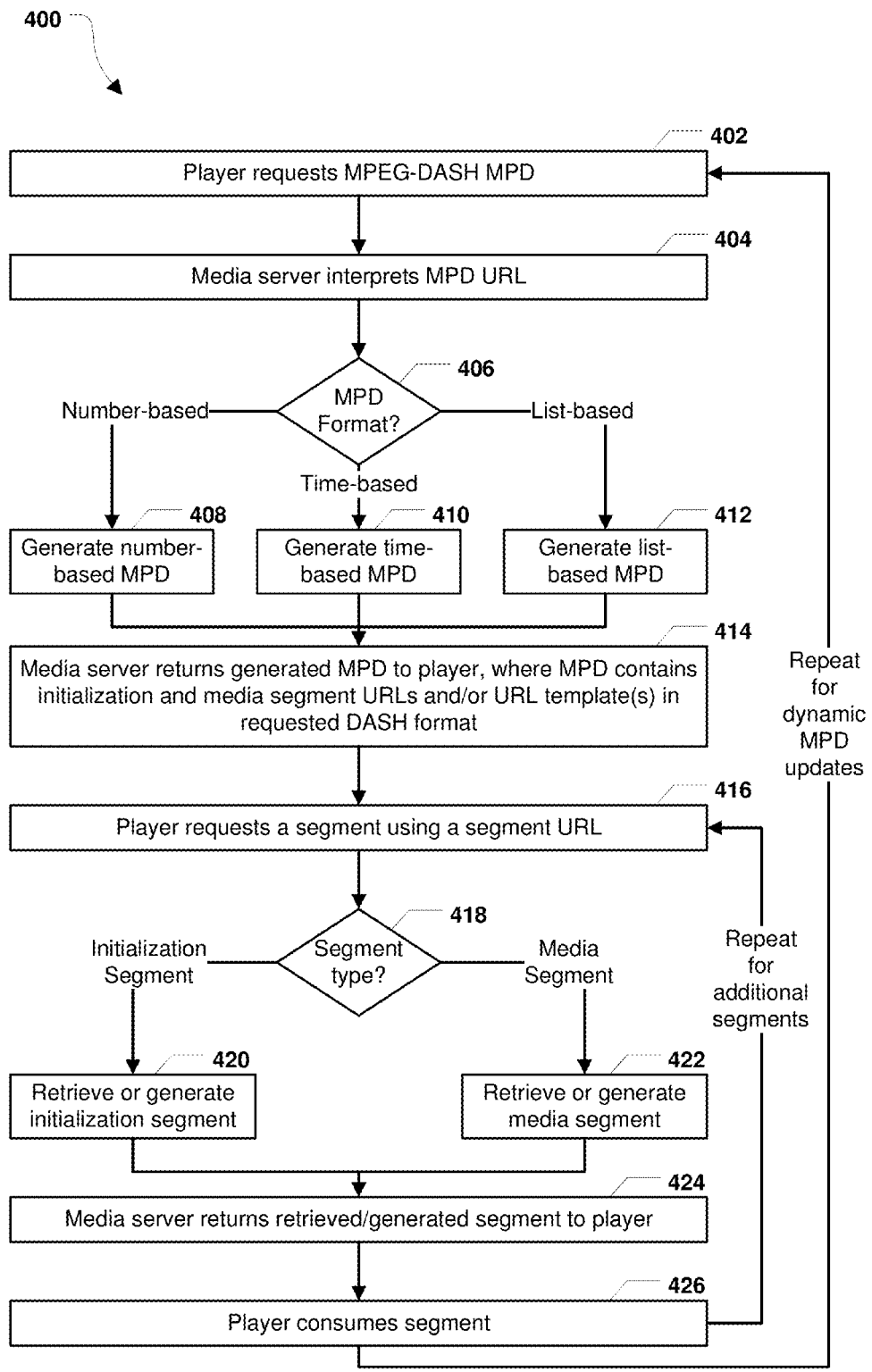
FIG. 4 is a flowchart of another particular embodiment of a method of operation at the system of FIG. 1 or the system of FIG. 2.

FIG. 4 illustrates another particular embodiment of a method 400 of operation at the system 100 of FIG. 1 or the system 200 of FIG. 2. At 402, a player requests an MPEG-DASH MPD. Continuing to 404, a media server interprets an MPD URL. For example, referring to FIG. 1, the media player 191 may request an MPD file and the URL interpreter 141 may interpret the corresponding MPD request URL.

Advancing to 406, a determination is made regarding a requested MPD format (or a default MPD format if the request does not specify an MPD format). When a number-based MPD is requested (or is the default format), the method 400 includes generating a number-based MPD, at 408. When a time-based MPD is requested (or is the default format), the method 400 includes generating a time-based MPD, at 410. When a list-based MPD is requested (or is the default format), the method 400 includes generating a list-based MPD, at 412. For example, referring to FIG. 1, the MPD may be the manifest 160 and may include the number-based URL template 161, the time-based URL template 162, or the list of URLs 163.

Continuing to 414, the media server returns the generated MPD to the media player. The MPD contains initialization and media segment URLs and/or URL templates in a requested DASH format. For example, the requested DASH format may be ISOBMFF muxed, ISOBMFF demuxed, MPEG-TS muxed, WebM muxed, WebM demuxed, etc. At 416, the media player requests a segment using a segment URL. The segment URL may be extracted from the MPD file or may be dynamically generated based on a URL template in the MPD file.

Advancing to 418, a determination is made regarding a type of the requested segment. When the requested segment is an initialization segment, the method 400 includes retrieving (e.g., from cache) or generating (e.g., from a segment template) the initialization segment, at 420. The initialization segment may include data to initialize the media player. Alternately, or in addition, the initialization segment may be used by the media player to verify whether the media player is capable of decoding certain audio and/or video formats. When the requested segment is a media segment, the method 400 includes retrieving (e.g., from cache) or generating (e.g., from a segment template) the media segment, at 422. In an illustrative embodiment, the media segment is includes approximately ten seconds of muxed A/V data, demuxed audio data, or demuxed video data.

The media server may return the retrieved/generated segment to the media player, at 424, and the media player may consume the segment, at 426. For example, consuming the segment may include performing one or more operations at the media player, such as playing audio content, playing video content, playing multimedia content, etc. The method 400 may return to 416 and repeat for additional segments, as shown. The method 400 may also return to 402 and repeat for dynamic MPD updates, as shown. To illustrate, dynamic MPD updates may occur for MPEG-DASH live streaming but may not occur for MPEG-DASH VOD streaming.

It should be noted that the order of steps or operations described with reference to FIGS. 1-4 is to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the media server 110 of FIG. 1, the computing device 190 of FIG. 1, the media server 250 of FIG. 2, the desktop/laptop computing device 271 of FIG. 2, the TV/set-top box 272 of FIG. 2, the smartphone 273 of FIG. 12 the tablet computer 274 of FIG. 2, the media server/stream relay server 281 of FIG. 2, a server (e.g., edge server) of the CDN 282 FIG. 2, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable or a processor-readable device. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). In addition to such live feeds, the described systems and methods may also be used in conjunction with "live linear television (TV)" streams. A live linear TV stream may correspond to a VOD asset being rebroadcast as a live feed. It should also be noted that although certain embodiments may be described herein with reference to video on demand, not all of the described techniques may require video content or data. Certain embodiments may also be used on demand content that does not include video (e.g., audio on demand radio or music streams).

In a particular embodiment, a method includes receiving, at a media server from a computing device, a first request for a manifest associated with media content. The method also includes generating, at the media server, the manifest based on a manifest type and a content segmentation type. The manifest identifies one or more segments of one or more adaptive streaming renditions. The method further includes sending the manifest from the media server to the computing device. The method includes receiving a second request from the computing device, where the second request identifies a requested segment of an adaptive streaming rendition identified by the manifest. The method also includes sending the requested segment from the media server to the computing device in response to the second request.

In another particular embodiment, an apparatus includes a processor and a memory storing instructions executable by the processor to perform operations including receiving, at a media server from a computing device, a first request for a manifest associated with media content. The operations also include generating, at the media server, the manifest based on a manifest type and a content segmentation type. The manifest identifies one or more segments of one or more adaptive streaming renditions. The operations include sending the manifest from the media server to the computing device and receiving a second request from the computing device. The second request identifies a requested segment of an adaptive streaming rendition identified by the manifest. The operations also include sending the requested segment from the media server to the computing device in response to the second request.

In another particular embodiment, a computer-readable storage device storing instructions that, when executed by a computer, cause the computer to perform operations including receiving, at a media server, a first segment of a media stream. The operations also include generating one or more segment templates at the media server. Each of the one or more segment templates is associated with a corresponding content segmentation type and identifies a start position and an end position of the first segment in the media stream. The operations further include receiving, from a computing device, a first request for an adaptive streaming manifest associated with the media stream. The operations include generating, at the media server, the manifest based on a manifest type and a content segmentation type. The manifest type may be identified by the first request or may be a default manifest type. The content segmentation type may be identified by the first request or may be a default content segmentation type. The manifest identifies one or more segments of one or more adaptive streaming renditions. The operations also include sending the manifest from the media server to the computing device and receiving a second request from the computing device. The second request identifies a requested segment of an adaptive streaming rendition identified by the manifest. The operations further include generating, in response to the second request, the requested segment based on a particular segment template of the one or more segment templates. The operations include sending the generated segment from the media server to the computing device in response to the second request.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a media server, a source stream from a source distinct from the media server;

receiving, at the media server from a computing device, a first request for a manifest associated with the source stream, wherein the first request includes a manifest type and a computing device identifier;
transcoding, at the media server, the source stream to generate at least one transcoded stream based on the first request, wherein the at least one transcoded stream corresponds to a particular adaptive bitrate (ABR) rendition of the source stream, and wherein the at least one transcoded stream is key frame aligned with respect to the source stream;
generating, at the media server in response to the first request, the manifest based on the manifest type and a content segmentation type, wherein the manifest identifies one or more segments of the at least one transcoded stream;
sending the manifest from the media server to the computing device;
in response to sending the manifest to the computing device, receiving a second request from the computing device, wherein the second request includes the computing device identifier and a first uniform resource locator (URL); and
sending at least one segment of the one or more segments from the media server to the computing device in response to the second request.

2. The method of claim 1, wherein the content segmentation type is identified by the first request or is a default content segmentation type.

3. The method of claim 1, wherein the manifest comprises a motion picture experts group (MPEG) dynamic adaptive streaming over HTTP (MPEG-DASH) media presentation description (MPD).

4. The method of claim 1, wherein the content segmentation type identifies whether audio content and video content are to be sent to the computing device as multiplexed segments or as non-multiplexed segments.

5. The method of claim 1, wherein the content segmentation type identifies a container format.

6. The method of claim 5, wherein the container format complies with an international standards organization base media file format (ISOBMFF), a motion picture experts group 2 transport stream (MPEG-TS) format, an extensible binary markup language (EBML) format, a WebM format, a Matroska format, or any combination thereof.

7. The method of claim 1, wherein the first URL included in the second request includes an adaptive streaming rendition identifier.

8. The method of claim 1, wherein the first request indicates a time-based manifest type, and wherein the at least one segment comprises a media segment that includes audio content, video content, or a combination of audio content and video content.

9. The method of claim 1, wherein media content of the source stream corresponds to a live stream, a video on demand (VOD) stream, or a linear live television stream, and wherein the first request includes a target segment duration.

10. The method of claim 9, further comprising:
receiving a segment of a media stream;
generating one or more segment templates at the media server, wherein each of the one or more segment templates is associated with a corresponding content segmentation type and identifies a start position of the segment in the media stream and an end position of the segment in the media stream;
sending, to the computing device, a graphical user interface that includes options for the target segment duration;
receiving a selection of one of the options; and
generating, in response to the second request, the at least one segment based on a particular segment template of the one or more segment templates.

11. An apparatus comprising:
a processor; and
a memory storing instructions executable by the processor to perform operations comprising:
receiving, at a media server, a source stream from a source distinct from the media server;
receiving, at the media server from a computing device, a first request for a manifest associated with the source stream, the first request including a manifest type and a computing device identifier;
transcoding, at the media server, the source stream to generate at least one transcoded stream based on the first request, wherein the at least one transcoded stream corresponds to a particular adaptive bitrate (ABR) rendition of the source stream, and wherein key frames of the at least one transcoded stream are aligned with key frames of the source stream;
generating, at the media server in response to the first request, the manifest based on the manifest type and a content segmentation type, wherein the manifest identifies one or more segments of the at least one transcoded stream;
sending the manifest from the media server to the computing device;
in response to sending the manifest to the computing device, receiving a second request from the computing device, wherein the second request includes the computing device identifier and a first uniform resource locator (URL), the first URL including the manifest type; and
sending at least one segment from the media server to the computing device in response to the second request.

12. The apparatus of claim 11, wherein the manifest comprises a motion picture experts group (MPEG) dynamic adaptive streaming over HTTP (MPEG-DASH) media presentation description (MPD), and wherein the at least one segment is sent from the media server to the computing device via a MPEG-DASH protocol.

13. A computer-readable storage device storing instructions that, when executed by a processor, cause the processor to perform operations comprising:
receiving, at a media server, a source stream from a source distinct from the media server;
receiving, from a first computing device, a first request for a manifest associated with the source stream, the first request including a manifest type;
transcoding, at the media server, the source stream to generate at least one transcoded stream, wherein the at least one transcoded stream corresponds to at least one adaptive bitrate (ABR) rendition of the source stream, and wherein the at least one transcoded stream is key frame aligned with respect to the source stream;
generating segment templates for the at least one transcoded stream, wherein a uniform resource locator (URL) template is associated with one of the generated segment templates; and
sending, from the media server to the first computing device, a first manifest that identifies one or more segments of the at least one transcoded stream, wherein the first manifest is generated by the media server responsive to a request from the first computing device and based on a manifest type, the request including the manifest type, a computing device identifier, and a URL template, the URL template having a URL for at least one segment of the one or more segments, and the URL of the URL template corresponding to the manifest media; and sending the at least one segment from the media server to the first computing device in response to a second request that includes the computing device identifier, wherein the at least one segment comprises an initialization segment that includes data configured to initialize a media player at the first computing device to determine whether the first computing device is capable of decoding particular media content.

14. The computer-readable storage device of claim 13, wherein the second request comprises a segment request URL, wherein the segment request URL is time-based, and wherein the segment request URL includes a segment start time.

15. The computer-readable storage device of claim 13, wherein the first manifest comprises a motion picture experts group (MPEG) dynamic adaptive streaming over HTTP (MPEG-DASH) media presentation description (MPD).

16. The computer-readable storage device of claim 13, wherein the first manifest is generated based on a requested content segmentation type that identifies whether audio content and video content are to be sent to the first computing device as multiplexed segments or as non-multiplexed segments, and wherein the operations further comprise aligning, at the media server, key frames of the at least one transcoded stream with key frames of the source stream.

17. The computer-readable storage device of claim 16, wherein the requested content segmentation type identifies a container format.

18. The computer-readable storage device of claim 17, wherein the container format complies with an international standards organization base media file format (ISOBMFF), a motion picture experts group 2 transport stream (MPEG-TS) format, an extensible binary markup language (EBML) format, a WebM format, a Matroska format, or any combination thereof.

19. The method of claim 1, wherein the manifest type comprises at least one of a list-based manifest type, a time-based manifest type, or a number-based manifest type.

20. The method of claim 1, wherein the computing device identifier enables a number of requested segments, a number of ABR rendition switches, session information, or any combination thereof.

* * * * *